(12) United States Patent
Todaka et al.

(10) Patent No.: US 8,746,582 B2
(45) Date of Patent: Jun. 10, 2014

(54) HOT AND COLD WATER MIXING VALVE

(75) Inventors: Kensaku Todaka, Fukuoka (JP); Hideyuki Matsui, Fukuoka (JP); Eiji Seki, Tokyo (JP); Isao Negishi, Tokyo (JP)

(73) Assignees: Toto Ltd., Kitakyushu-shi (JP); Nippon Thermostat Co., Ltd., Tokyo (JP)

( * ) Notice: Subject to any disclaimer, the term of this patent is extended or adjusted under 35 U.S.C. 154(b) by 1038 days.

(21) Appl. No.: 12/745,415

(22) PCT Filed: Dec. 1, 2008

(86) PCT No.: PCT/JP2008/071767
§ 371 (c)(1),
(2), (4) Date: Sep. 30, 2010

(87) PCT Pub. No.: WO2009/072455
PCT Pub. Date: Jun. 11, 2009

(65) Prior Publication Data
US 2011/0011942 A1    Jan. 20, 2011

(30) Foreign Application Priority Data
Dec. 6, 2007 (JP) .................. 2007-315417

(51) Int. Cl.
*G05D 23/185* (2006.01)
(52) U.S. Cl.
USPC .............. 236/12.11; 236/12.1; 236/12.16; 236/93 R; 236/101 R; 236/102
(58) Field of Classification Search
USPC .............. 236/12.1, 12.11, 12.16, 12.2, 12.21, 236/93 R, 101 R, 102
See application file for complete search history.

(56) References Cited

U.S. PATENT DOCUMENTS

| 3,685,728 A | 8/1972 | Chapou |
| 7,611,068 B2 * | 11/2009 | Iwai et al. .................. 236/12.1 |
| 2008/0035209 A1 | 2/2008 | Negishi et al. |

FOREIGN PATENT DOCUMENTS

| JP | 49-33371 B1 | 9/1974 |
| JP | 2-16880 U | 2/1990 |
| JP | 2001-4050 A | 1/2001 |
| JP | 2002-147645 A | 5/2002 |
| JP | 2006-307971 A | 11/2006 |

OTHER PUBLICATIONS

International Search Report of PCT/JP2008/071767, mailing date of Feb. 24, 2009.

* cited by examiner

*Primary Examiner* — Cheryl J Tyler
*Assistant Examiner* — Jonathan Bradford
(74) *Attorney, Agent, or Firm* — Westerman, Hattori, Daniels & Adrian, LLP (57) ABSTRACT

The hot and cold water mixing valve having a cylindrical casing is provided with a control valve member which adjusts a ratio between hot and cold water inlets by balancing loads applied by a biasing member and an actuator, and cylindrical temperature adjuster which adjusts a position of the control valve member when rotated. In the temperature adjuster, an upper surface is formed at one end, a knob is provided in the center of the upper surface, and a ring-shaped recess is formed around the knob at the upper surface. The temperature adjuster is arranged inside the casing and the knob is inserted, coaxially with the casing, into the hole which opens at one end of the casing. A spacer which covers the recess is interposed and held between the upper surface of the temperature adjuster and one end of the casing.

4 Claims, 4 Drawing Sheets

RELATED ART

HOT AND COLD WATER MIXING VALVE

TECHNICAL FIELD

The present invention relates to a technology of a hot and cold water mixing valve.

BACKGROUND ART

Conventionally, a hot and cold water mixing valve has been used for controlling a temperature of a mixture of hot and cold water by biasing a movable valve for changing a mixture ratio of hot water to cold water by means of a spring made of a shape memory alloy whose spring coefficient changes with temperature. Such a hot and cold water mixing valve is disclosed in Patent Document 1, for example. Here, a structure of the hot and cold water mixing valve disclosed in Patent Document 1 will be shown in and described with reference to FIG. 4.

Figure 4:
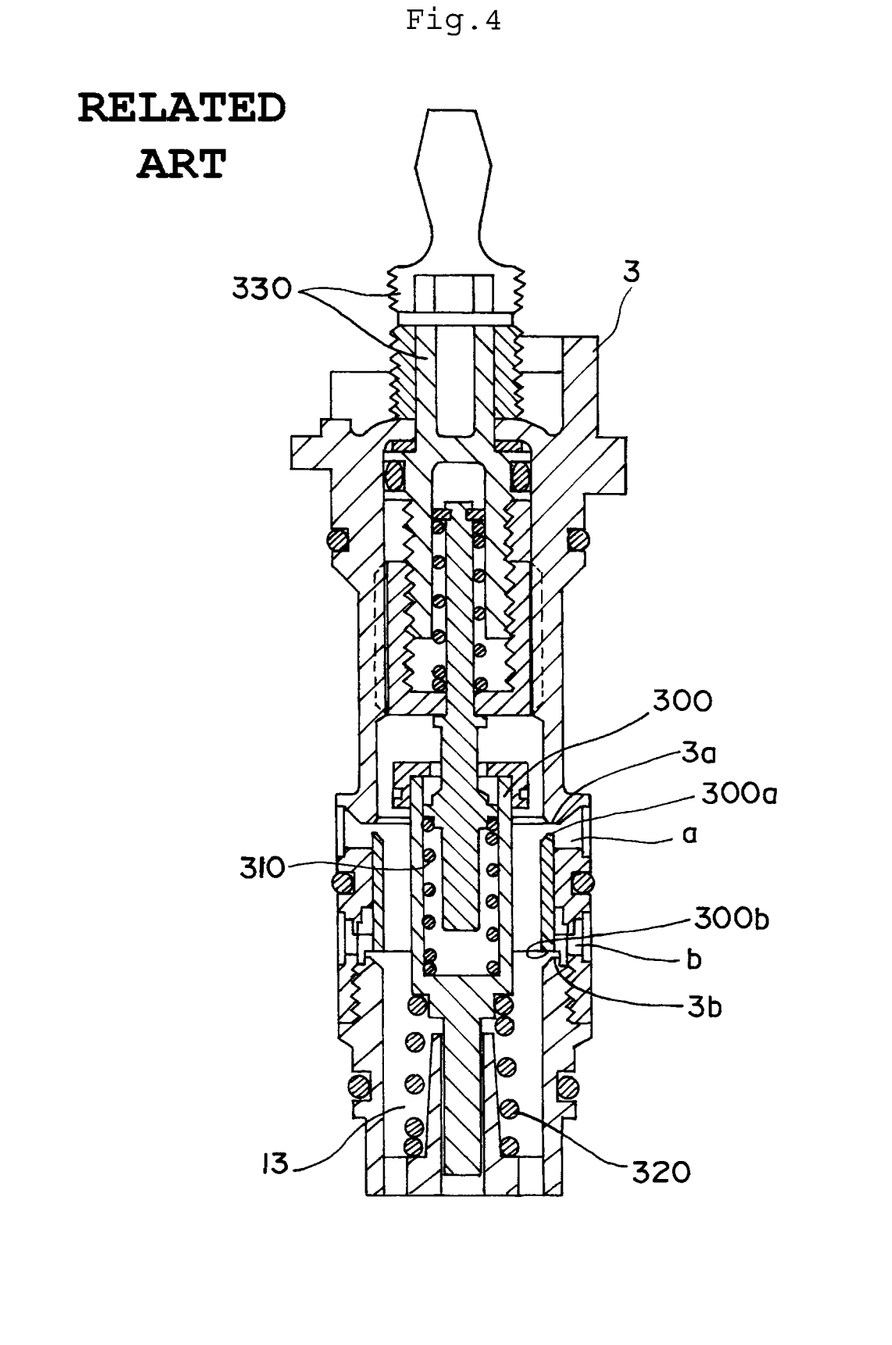
FIG. 4 A longitudinal sectional view of a principal part of a conventional hot and cold water mixing valve.

As shown in FIG. 4, the hot and cold water mixing valve in Patent Document 1 employs a structure in which a cylindrical casing 3 is provided with a control valve mechanism. A hot water inlet a through which hot water flows and a cold water inlet b through which cold water flows are formed at a cylinder wall of the casing 3 and arranged in parallel in an axial direction. A hot water valve seat 3a is formed in a position inside the hot water inlet a, and a cold water valve seat 3b is formed in a position inside a cold water inlet. Further, a mixing chamber 13 which communicates with the hot water inlet a and the cold water inlet b is formed at one end of the casing 3. A temperature adjusting means 330 which is subjected to temperature setting by a user is formed at another end.

A control valve member 300 which is movable in an axial direction of the casing is incorporated between the hot water valve seat 3a and the cold water valve seat 3b which are formed in the casing 3. This control valve member 300 whose one end is subjected to a load of a bias spring 310 which is in abutment with the temperature adjusting means 330 and whose other end is subjected to a load of a spring 320 (temperature sensitive spring) which is made of a shape memory alloy and disposed in the mixing chamber 13 changes an opening/closing ratio between the hot water inlet a and the cold water inlet b by balancing between the loads applied by the bias spring 310 and the temperature sensitive spring 320.

Then, a user operates the temperature adjusting means 330 and adjusts a position of the control valve member 300 to thereby change the opening/closing ratio between the hot water inlet and the above-mentioned cold water inlet and to set up a temperature of mixed water to be discharged from the hot and cold water mixing valve. Further, for example, in a situation where a desired temperature is set up by the temperature adjusting means 330, it is assumed that the temperature of the mixed water in the mixing chamber 13 rises since a flow rate of the incoming water decreases etc., due to a hydraulic pressure drop etc. In this case, the temperature sensitive spring 320 disposed in the mixing chamber 13 acts to increase the generating load to move the position of the control valve member so that the temperature of the mixed water is controlled by changing the opening/closing ratio between the hot water inlet and the cold water inlet.

Patent Document 1: Japanese Patent Application Publication No. 2006-307971

DISCLOSURE OF THE INVENTION

Object of the Invention

Incidentally, in the hot and cold water mixing valve, attempts to increase the flow rate of the mixed water to be discharged may lead to the necessity of increasing quantities of the hot water and cold water which flow into the hot and cold water mixing valve. However, when the flow rates of hot water and the cold water which flow through the hot and cold water mixing valve increase, a pressure applied to components inside the hot and cold water mixing valve and the casing also increases. Thus, there is a problem of raising a possibility of damaging the hot and cold water mixing valve.

Further, if the hot and cold water mixing valve (a part of the casing of the hot and cold water mixing valve, for example) is damaged, there may occur a hot water leakage and a cold water leakage. Furthermore, if a component which constitutes the control valve member inside the hot and cold water mixing valve is damaged for example, the controllability of the valve may become worse and exact temperature adjustment may not be achieved.

In addition, the above-mentioned hot and cold water mixing valve of the conventional technique is not particularly considered to increase the durability.

The present invention arises in view of the above-mentioned situations, and the present invention aims at increasing the durability of the hot and cold water mixing valve.

Means to Solve the Problems

The present invention for solving the above-mentioned problems is applied to a hot and cold water mixing valve provided with a temperature adjusting dial which is subjected to temperature control operation, and a main body member having a control valve mechanism for adjusting temperatures of hot water and cold water by operating the above-mentioned temperature adjusting dial and a casing in which a hot water inlet and a cold water inlet are formed and the above-mentioned control valve mechanism is accommodated.

Further, a hole opens in an axial center part of one end of the above-mentioned casing, the above-mentioned main body member comprises a biasing member made of a material having a fixed spring constant, an actuator which expands or shrinks according to a temperature change, a control valve member in which one end is subjected to a load from the above-mentioned biasing member and the other end is subjected to a load from the above-mentioned actuator, and an opening/closing ratio between the above-mentioned hot water inlet and the above-mentioned cold water inlet is changed by balancing between the loads applied by the above-mentioned biasing member and the above-mentioned actuator, and a temperature adjusting means whose one side is fixed to the above-mentioned temperature adjusting dial and which moves the above-mentioned biasing member according to rotation of the above-mentioned temperature adjusting dial to apply a load to the above-mentioned control valve member and to set up a position of the above-mentioned control valve member, and is formed in the shape of a cylinder, an upper surface is formed at one cylindrical end of the above-mentioned temperature adjusting means, a knob which is substantially cylindrical and fixed to the above-mentioned temperature adjusting dial is formed in the center of the above-mentioned upper surface, and a ring-shaped recess concentric with the above-mentioned knob is formed at peripheral part of the above-mentioned knob at the above-mentioned upper surface, the above-mentioned temperature adjusting means is arranged inside one end of the above-mentioned casing and coaxially with the above-mentioned casing, the above-mentioned knob is rotatably inserted into the hole which opens at one end of the above-mentioned casing, and a spacer for covering the recess formed at the above-mentioned upper surface is interposed between the upper surface of the above-mentioned temperature adjusting means and one end of the above-mentioned casing.

As described above, the present invention is characterized in that the ring-shaped recess concentric with the knob is formed at the peripheral part of the knob at the upper surface of the temperature adjusting means which is formed cylindrically, and the spacer for covering the recess formed at the above-mentioned upper surface is sandwiched between the upper surface of the temperature adjusting means and one end of the spacer.

With this structure, the loads (the load from the inside of the hot and cold water mixing valve and attraction when the knob is pulled) applied to peripheral part, which is weak in strength in the casing of the hole which opens at the one end, is reduced, so that the possibility of the peripheral part of the hole formed at the casing being damaged can be reduced. In other words, by employing this structure, it is possible to reduce the possibility that a hot water leakage or a cold water leakage caused by breakage of the casing may occur.

Further, the present invention for solving the above-mentioned problems is applied to a hot and cold water mixing valve provided with a casing in which a hot water inlet and a cold water inlet are formed, and a main body member provided in the above-mentioned casing.

Further, the above-mentioned main body member comprises a biasing member made of a material having a fixed spring constant, an actuator which expands or shrinks according to a temperature change, a control valve member in which one end is subjected to a load from the above-mentioned biasing member and the other end is subjected to a load from the above-mentioned actuator, and an opening/closing ratio between the above-mentioned hot water inlet and the above-mentioned cold water inlet is changed by balancing between the loads applied by the above-mentioned biasing member and the above-mentioned actuator so as to adjust a mixture ratio between the hot water flowing in through the above-mentioned hot water inlet and the cold water flowing in through the above-mentioned cold water inlet, and a holder in which a support face for supporting one end of the above-mentioned actuator is formed, a mixing chamber for mixing hot water from the above-mentioned hot water inlet and cold water from the above-mentioned cold water inlet is provided inside the above-mentioned casing, the above-mentioned actuator is supported between a support portion formed in the above-mentioned mixing chamber and the above-mentioned support face of the above-mentioned holder, and a reinforcement member is interposed and held between a face opposite to the above-mentioned support face formed in the above-mentioned holder and the above-mentioned other end of the above-mentioned control valve member.

As described above, the present invention is characterized in that the reinforcement member is provided between the control valve member and the holder which supports the actuator to thereby improve the strength of the holder and to prevent breakage of the holder.

In particular, if the holder which supports the actuator is damaged, there arises a problem that the control valve member of the hot and cold water mixing valve is subjected to only the load from the biasing member so that the mixed water may be discharged from a discharge orifice at a high temperature. Therefore, with the structure in accordance with the present invention the strength of the holder is improved so that a possibility that the mixed water with a high temperature, which the user does not expect, may be discharged and caused in the case where the holder is damaged is reduced.

Further, it is desirable that the above-mentioned reinforcement member is a metal washer which covers substantially the whole face opposite to the above-mentioned support face of the above-mentioned holder and the above-mentioned holder is made of a resin.

Thus, forming the reinforcement member into the above-mentioned shape, the strength of the holder can be increased with components having a smaller volume. Therefore, according to this arrangement, not only the holder is strengthened but also the holder is reduced in size, so that the space of the mixing chamber can be reliably obtained, to thereby contribute to miniaturization of the hot and cold water mixing valve.

Further, it is desirable that the above-mentioned reinforcement member is a washer which covers substantially the whole face opposite to the above-mentioned support face of the above-mentioned holder and the above-mentioned reinforcement member and the above-mentioned holder are respectively molded from materials with different properties.

For example, the holder may be formed of a resin and the reinforcement member may be formed of a metal. The reinforcement member has higher strength and hardness than the holder, while it does not come into contact with the actuator, thus leading to the reduction in heat conductivity, and preventing the temperature adjusting performance from worsening. In addition, as for the reinforcement member, a material having a lower heat conductivity than the holder may only be selected. When the reinforcement member is made of a resin, it is possible to use an additive etc. and change physical properties so as to lower the heat conductivity. As described above, since the reinforcement member is smaller in volume than the holder, it is possible to reduce the costs even if a material different from that for the holder is used for the reinforcement member.

Effect of the Invention

Thus, according to the hot and cold water mixing valve of the present invention, it is possible to improve the durability of the hot and cold water mixing valve.

DESCRIPTION OF REFERENCE SIGNS

D—temperature adjusting dial
a—hot water inlet
b—cold water inlet c—mixed water outlet
1—casing
1a—cover member
11—upper surface
12—hole
1b—main body
10a—hot water valve seat
19—spline slot
1c—valve seat member
10b—cold water valve seat
26—male screw
170—valve seat holding portion
172—rib
2—control valve member
2a—hot water valve
2b—cold water valve
20—cylinder portion
4—biasing member
5—actuator
5a—SMA spring
5b—SMA spring
6—support member
62-63—engaging members
700—holder
7—cover
70—spring bracket
71—spring bracket
72-73—spring brackets
8—adjusting screw
81—upper surface
82—knob
83—recess
84—open end
85—female screw
9—adjusting screw shaft
90—support portion
91—spline
92—male screw
93—hole
94—skirt portion
13—mixing chamber

BEST MODE FOR CARRYING OUT THE INVENTION

Hereafter, the preferred embodiments of the present invention will be described with reference to the drawings.

Figure 1A:
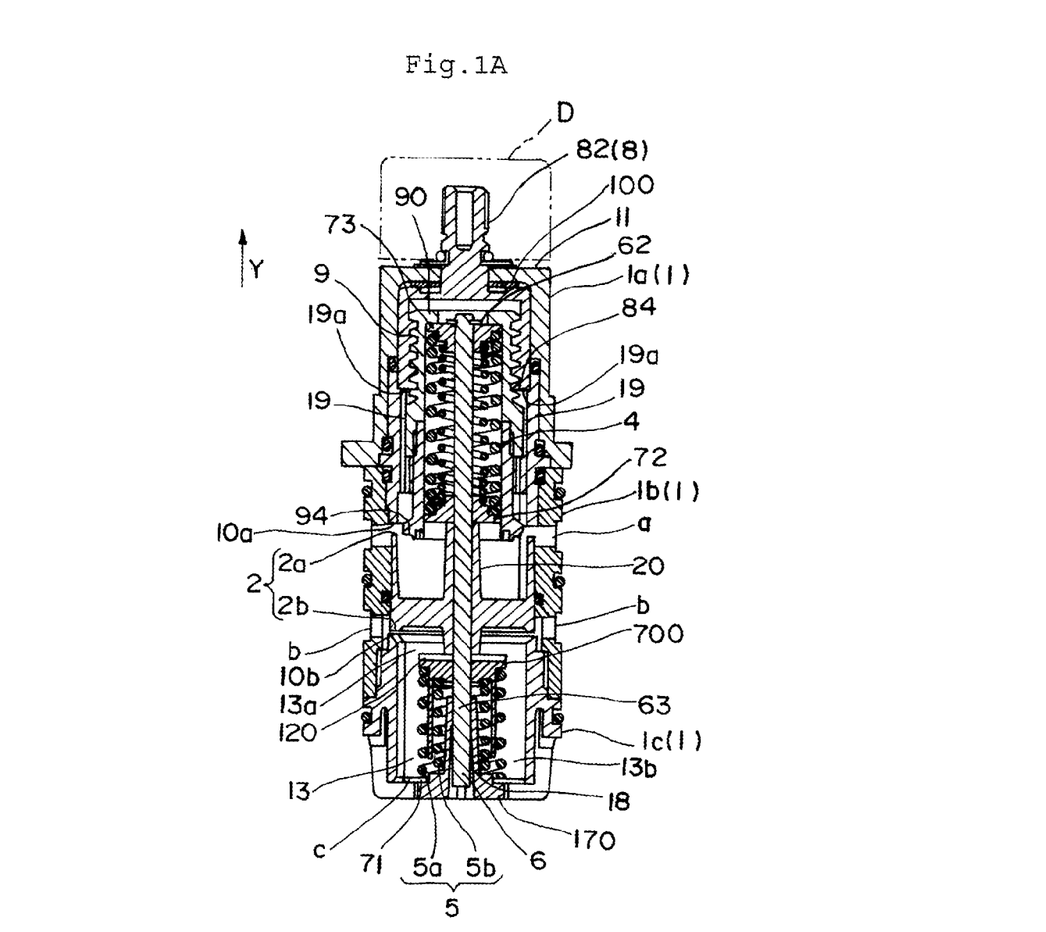
FIG. 1A A longitudinal sectional view of a principal part of a hot and cold water mixing valve in accordance with a preferred embodiment of the present invention.
Figure 1B:
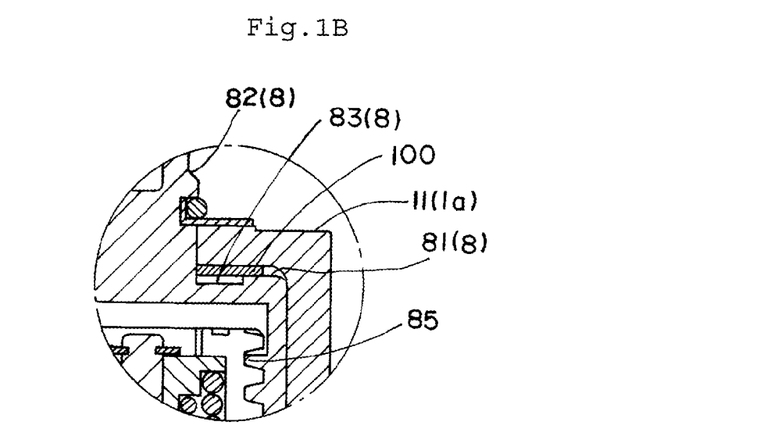
FIG. 1B An enlarged view of a part of a cover member and an adjusting screw of the longitudinal sectional view shown in FIG. 1A.
Figure 2:
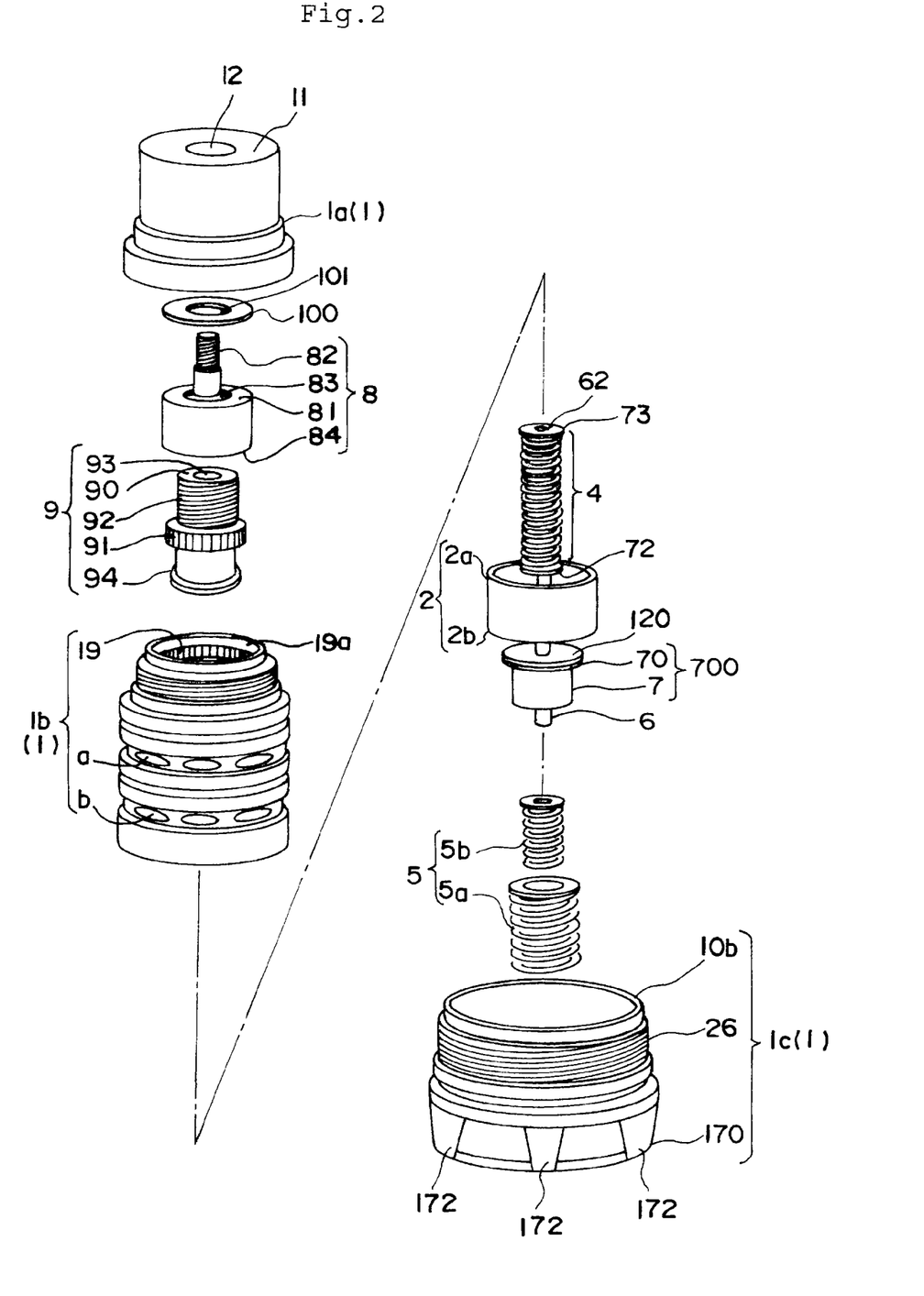
FIG. 2 A schematic view of principal components of the hot and cold water mixing valve in accordance with a preferred embodiment of the present invention.

FIG. 1A is a longitudinal sectional view of a main body of a hot and cold water mixing valve in accordance with the preferred embodiment of the present invention. FIG. 1B is an enlarged view of a part of a cover member and an adjusting screw of the longitudinal sectional view shown in FIG. 1A. Further, FIG. 2 is a schematic view of principal components of the hot and cold water mixing valve in accordance with the preferred embodiment of the present invention.

As illustrated, the hot and cold water mixing valve is assembled so that a control valve mechanism may be accommodated in a cylindrical casing 1. In addition, the casing 1 is constituted by a cylindrical main body 1b, a cover member 1a attached to one end side of the main body 1b, and a valve seat member 1c attached to the other end side of the main body 1b, so as to be formed cylindrically.

The hot water inlet a through which hot water flows and the cold water inlet b through which cold water flows are formed in parallel in an axial direction at a cylinder wall of the casing 1. Further, a mixing chamber 13 which communicates with the hot water inlet a and the cold water inlet b is formed to extend from the inside of the hot water inlet a of the casing 1 towards one end (lower end in FIG. 1A) of the casing 1. The mixing chamber 13 is constituted by an upstream mixing-chamber 13a upstream of a holder 700 to be set forth later and a downstream mixing-chamber 13b, downstream of the holder 700, where an actuator 5 is disposed. A mixed water outlet c for discharging the mixed water is formed at an end of this downstream mixing-chamber 13b. The hot water flowed through the hot water inlet a and the cold water flowed through the cold water inlet b each flow into the mixing chamber 13, and the cold water and hot water are mixed in the mixing chamber 13 and discharged through the mixed water outlet c.

A hot water valve seat 10a is formed in the position inside the hot water inlet a at the casing 1, and a cold water valve seat 10b is formed in the position inside the cold water inlet b. Further, a control valve member 2 which is movable in an axial direction of the casing 1 is incorporated between the hot water valve seat 10a and the cold water valve seat 10b which are formed in the casing 1. The control valve member 2 is formed cylindrically, a hot water valve 2a is formed at one end edge (upper end edge in FIG. 1A) of the cylinder wall, and a cold water valve 2b is formed at the other end edge (lower end edge in FIG. 1A).

Furthermore, a biasing member 4 for biasing the control valve member 2 towards the cold water valve seat 10b side and an actuator 5 for biasing the control valve member 2 towards the hot water valve seat 10a side are incorporated within the casing 1.

The biasing member 4 is formed of a material having a property of a fixed spring constant. A particular structure of the biasing member 4 is not particularly limited, but in this preferred embodiment the description will be carried out with reference to an example in which coil springs formed of materials having fixed spring constants respectively are arranged in parallel, inside and outside, to be used for the biasing member 4.

The actuator 5 expands or shrinks according to a temperature change. In the preferred embodiment, although a particular structure of the actuator 5 is not particularly limited, the description will be carried out with reference to an example in which a spring made of a shape memory alloy (SMA (Shape memory alloy) spring) formed of a material whose spring constant changes with temperatures is used for the actuator 5.

Further, the control valve member 2 adjusts a spacing between the hot water valve 2a and the hot water valve seat 10a and a spacing between the cold water valve 2b and the cold water valve seat 10b by balancing between the loads applied by the biasing member 4 and the actuator 5. With this structure, the hot and cold water mixing valve adjusts a mixture ratio of the hot water which flows in through the hot water inlet a to the cold water which flows in through the cold water inlet b.

Further, a temperature adjusting means (adjusting screw 8, adjusting screw shaft 9) which is subjected to rotation operation of the temperature adjusting dial D, changes the load in the axial direction applied to the biasing member 4 according to the rotation operation, and adjusts an axial position of the control valve member 2 is incorporated within the casing 1. Thus, by operating the temperature adjusting dial D, a user can set up or change the position of the control valve member 2 so that the mixed water with a desired temperature may be discharged.

Further, in this preferred embodiment, a recess 83 is provided around a knob 82 of the adjusting screw 8 which constitutes the temperature adjusting means, and a spacer 100 is disposed between the cover member 1a of the casing 1 and the adjusting screw 8 so as to cover the recess 83 (particular structure will be described later in detail).

With this structure, it is possible to reduce the load (the load from the inside of the hot and cold water mixing valve or attraction when the knob 82 is pulled) applied to peripheral part of the hole 12 of the cover member 1a which is weak in strength in the casing 1, whereby a hot water leakage or a cold water leakage caused by breakage of the casing 1 can be prevented from generating.

Further, the above-mentioned actuator 5 is supported between a spring bracket 71 formed inside the mixing chamber 13 and the holder 700.

Furthermore, in this preferred embodiment, a reinforcement member 120 is mounted between the holder 700 which supports the actuator 5 disposed in the mixing chamber 13 and the control valve member 2 biased in the axial direction by the actuator 5. This structure improves the strength of the holder 700 subjected to the pressure of the actuator 5.

Next, a structure of the hot and cold water mixing valve of the preferred embodiment will be described in detail.

As illustrated, the hot and cold water mixing valve is provided with the casing 1 (cover member 1a, main body 1b, valve seat member 1c). Further, the spacer 100, the adjusting screw 8, the adjusting screw shaft 9 which is threadedly engaged with the adjusting screw 8, the control valve member 2, the biasing member 4, the two spring brackets 72 and 73 which support the biasing member 4, the actuator 5, the holder 700 which supports one end (upper side in FIG. 2) of the actuator 5, the reinforcement member 120, and the cylindrical shaft-like support member 6 are incorporated in the casing 1.

First, the casing 1 will be described. The casing 1 is formed by processing or machining a resin material, a metal material, etc., and is provided with the cylindrical cover member 1a, the cylindrical main body 1b, and the cylindrical valve seat member 1c.

The cover member 1a is formed in the shape of a cylinder in which one end is opened and an upper surface 11 is formed at the other end. The hole 12 opens in the center of the upper surface 11 of the cover member 1a.

The hot water inlet a and the cold water inlet b are provided in parallel in the axial direction at the cylinder wall of the main body 1b, and the hot water valve seat 10a is formed in an inner position of the hot water inlet a. The cold water seat 10b formed inside the cold water inlet b is formed at an inner end edge of the valve seat member 1c which is threadedly engaged with the main body 1b. Further, a spline slot 19 which regulates rotation of the adjusting screw shaft 9 is provided at an inner circumference face on one end side of the main body 1b (upper side in FIGS. 1A, 1B, and 2).

In the valve seat member 1c, a male screw 26 (see FIG. 2) which is threadedly engaged with the main body 1b is formed at one end and a valve seat holding portion 170 is formed at the other end.

The valve seat holding portion 170 is constituted by the disk-shaped spring bracket 71 disposed at an axis site of the valve seat member 1c, and a rib 172 extending along a diameter of the spring bracket 71. The rib 172 is integrally joined to a cylinder part of the valve seat member 1c.

A plurality of mixed water outlets c are formed and arranged in a circle around the spring bracket 71 at a surface, orthogonal to the axial direction, of the end in which the valve seat holding portion 170 of the valve seat member 1c is formed.

Further, as shown in FIG. 1A, a cylindrical inner room of the valve seat member 1c forms the mixing chamber 13 which mixes the hot water and cold water which respectively flow in through the hot water inlet a and the cold water inlet b. Furthermore, a guide hole 18 along an axial line direction is formed at the axis site of the spring bracket 71 on an inner face side of the valve seat member 1c.

Next, the adjusting screw 8 and spacer 100 which are characteristic elements of this preferred embodiment will be described.

The adjusting screw 8 is formed in the shape of a cylinder in which one end is opened and an upper surface 81 is formed at the other end. A knob 82 which is substantially cylindrical is formed in an axial center part of one face (face in abutment with spacer 100) of the upper surface 81. This knob 82 is fixed to the temperature adjusting dial D.

Further, the ring-shaped recess 83 concentric with the knob 82 is formed around the knob 82 at the upper surface 81 (see FIGS. 1B and 2). With this structure of the recess 83, at the upper surface 81 of the adjusting screw 8, a knob peripheral part (inner circumference face) is lower than a perimeter face relative to a plane orthogonal to an axis of the adjusting screw 8.

Further, as for the adjusting screw 8, a female screw 85 which is threadedly engaged with the adjusting screw shaft 9 is formed at the cylindrical inner circumference face.

A spacer 100 is formed in the shape of a disk, and a hole 101 into which the knob 82 of the adjusting screw 8 is inserted opens in the center of the spacer. In addition, a diameter of the spacer 100 is selected to be larger than that of the ring-shaped recess 83 formed at the upper surface 81 of the adjusting screw 8, and smaller than that of the upper surface 81 of the adjusting screw 8. Further, being disposed at the upper surface 81 of the adjusting screw 8, the spacer 100 is formed to have a shape and size so as to cover the recess 83 formed at the upper surface 81. For example, as this spacer 100, one with a small sliding friction, such as a washer made of a resin, can be used.

Next, an arrangement where the adjusting screw 8 and the spacer 100 are incorporated into the casing 1 will be described.

The knob 82 of the adjusting screw 8 is inserted through the hole 101 of the spacer 100, and the spacer 100 is disposed at the upper surface 81 of the adjusting screw 8. In that case, in order for the spacer 100 to be coaxial with the adjusting screw 8 and for ease of assembly etc, the diameter of the hole 101 is of a suitable size so as to fit onto a lower end of a shaft of the knob 82 of the adjusting screw 8, whereby the recess 83 is covered with the spacer 100. Further, in a situation where the spacer 100 is disposed at the upper surface 81 of the adjusting screw 8, the knob 82 is rotatably fitted into the hole 12 of the upper surface 11 from an open face of the cover member 1a towards the upper surface 11, and the spacer 100 is abutted against the inside of the upper surface 11 of the cover member 1a. Furthermore, when the main body 1b is threadedly engaged with the cover member 1a, a cylindrical open end 84 of the adjusting screw 8 is supported by an end 19a of the spline slot 19 of the main, body 1b. Thus, the adjusting screw 8 is supported between the upper surface 11 of the cover member 1a and the end 19a of the spline slot 19 of the main body 1b, and is arranged inside the casing 1 and coaxially with the casing 1.

As described above, reasons why the recess 83 is formed at the adjusting screw 8 and the spacer 100 is interposed and held between the adjusting screw 8 and the cover member 1a are as follows.

The upper surface 11 of the cover member 1a of the upper end (upper side in FIGS. 1A, 1B, and 2) of the casing 1 is subjected to the load in a direction (Y direction as shown in FIG. 1A) in which it is pushed up by internal pressure of the hot and cold water mixing valve. Further, the user may pull the temperature adjusting dial D. In this case, the upper surface 11 of the cover member 1a is subjected to the load in the direction (Y direction as shown in FIG. 1A) in which it is pushed up. In the conventional hot and cold water mixing valve, when the internal pressure increases, a peripheral part (with weak strength) of the hole 12 of the cover member 1a is pushed up towards the center and may be damaged. Further, in the conventional hot and cold water mixing valve, when the user pulls the temperature adjusting dial D (knob 82 of adjusting screw 8 fixed to temperature adjusting dial D), the peripheral part (with weak strength) of the hole 12 of the upper surface 11 of the cover member 1a is pushed up towards the center and may be damaged.

Thus, in this preferred embodiment, the recess 83 is provided around the knob 82 which is formed at the upper surface 81 of the adjusting screw 8 to cover the recess 83 with the spacer 100, then the knob 82 is inserted into the hole 12 of cover member a. Accordingly, the loads (the load from the inside of the hot and cold water mixing valve and the load when the knob 82 is pulled) applied to the peripheral part (which is weak in strength in the casing 1) of the hole 12 of the cover member 1a is reduced, so that the possibility of the peripheral part of the hole 12 of the cover member 1a being damaged can be reduced. In other words, with this structure, the load from the inside of the hot and cold water mixing valve is applied to the perimeter having high strength in the upper surfaces 11 of the cover member 1a of the casing 1.

Thus, in this preferred embodiment, since the strength of the casing 1 can be increased, it is possible to prevent the hot water leakage or cold water leakage caused by breakage of the casing from generating. Specifically in this preferred embodiment, the hot water flowed in through the hot water valve seat 10a is likely to stay on the upper surface 11 of the cover member 1a of the casing 1. Since the strength of the casing 1 is improved, it is possible to prevent the staying hot water with a high temperature from blowing out of the casing 1.

Next, a structure of the adjusting screw shaft 9 will be described. As shown in FIG. 2, the adjusting screw shaft 9 is formed cylindrically. In the adjusting screw shaft 9, one end is opened and a support portion 90 which is in abutment with a spring bracket 73 for supporting the biasing member 4 is formed at the other end. A hole 93 opens in the center of the support portion 90.

Further, in the adjusting screw shaft 9, a male screw 92 which is threadedly engaged with the female screw 85 (see FIG. 1B) formed in the cylindrical inner circumference of the adjusting screw 8 is formed at a perimeter face of the other end. Furthermore, in the adjusting screw shaft 9, a spline 91 which fits to the spline slot 19 formed at an inner circumference face of the main body 1b is formed at the perimeter face substantially in the center in the axial direction. Still further, a skirt portion 94 in the shape of a taper in which a lower end spreads in a radial direction is formed at one end.

Next, an arrangement of the adjusting screw shaft 9 within the casing 1 will be described. The adjusting screw shaft 9 is incorporated into the casing 1 in such a way that the male screw 92 is threadedly engaged with the female screw 85 formed at the inner circumference of the adjusting screw 8 which is incorporated into the casing 1a and the spline 91 is fitted to the spline slot 19 which is formed at the main body 1b.

The thus incorporated adjusting screw shaft 9 moves back and forth in the axial direction of the casing 1 according to the rotation operation of the adjusting screw 8. In addition, when the adjusting screw shaft 9 moves back and forth in the axial direction in the casing 1, the support member 6 and the engaging member 62 moves up and down through the hole 93.

According to the rotation operation of the adjusting screw 8, the adjusting screw shaft 9 varies an axial length of the biasing member 4 through the spring bracket 73 which is in abutment with the support portion 90, so as to vary a repulsive force of the biasing member 4.

Thus, the adjusting screw shaft 9 together with the adjusting screw 8 which is subjected to the rotation operation from the temperature adjusting dial D changes the load (repulsive force of the biasing member 4) applied in the axial direction of the biasing member 4, to thereby adjust the axial position of the control valve member 2.

In addition, as shown in FIG. 1A, the adjusting screw shaft 9 has a length allowing the skirt portion 94 to be arranged on a hot water side channel from the hot water inlet a to the mixing chamber 13 when the shaft is incorporated into the casing 1.

Thus, the skirt portion 94 formed in the shape of a taper in which one end spreads in a radial direction is provided between the hot water inlet a and the mixing chamber 13 so that an obstacle can be arranged at a hot water passage from the hot water inlet to the mixing chamber. With this structure, turbulence can be generated before the hot and cold water is mixed, so that the subsequent mixing of the hot and cold water is promoted. As a result, it is possible to attain a proper detection temperature of the actuator 5.

Further, force (pressure) of the hot water flowing toward the mixing chamber 13 can be reduced by providing the hot water passage with the skirt portion 94 which causes flow resistance (pressure loss). Therefore, according to this preferred embodiment, even if the pressure of the hot water which flows in through the hot water inlet a rises rapidly, the increase in the flow rate of the hot water which flows into the mixing chamber 13 is controlled by the skirt portion 94, so that a travel distance with which the control valve member 2 may widen the cold water valve side (distance with which it moves to widen the spacing between the cold water valve 2b and the cold water valve seat 10b) can be shortened (temperature adjustment can be performed in a short time). In other words, according to this preferred embodiment, by providing the skirt portion 94 which causes flow resistance (pressure loss), it is possible to reduce the influence of fluctuations in hot-water pressure. As a result, temperature adjusting performance is improved.

Further, the flow rate of the hot water which flows into the mixing chamber 13 can be limited by providing the skirt portion 94 which causes the flow resistance (pressure loss) in the hot water passage. Therefore, even if the pressure of the hot water rises rapidly, the hot water exceeding a predetermined flow rate does not flow into the mixing chamber 13, so that sudden actuation of the actuator 5 due to rapid increase in the flow rate of the hot water can be prevented. Thus, according to this preferred embodiment, hunching in which overshoot and undershoot are repeated is unlikely to occur, so that the accuracy in temperature control is improved.

Further, according to the above-mentioned structure, since an area which is directly struck by the hot water can be reduced, it is possible to reduce the influence (of the hot water which flows into the control valve member 2) on the operation of the control valve member, and to improve the accuracy in temperature control.

Next, the biasing member 4, the control valve member 2, the actuator 5, the holder 700, and the reinforcement member 120 will be described.

The biasing member 4 biases the control valve member 2 toward the cold water valve seat 10b side through a spring bracket 72. In addition, as long as the biasing member 4 is an biasing member which is in balance with the actuator 5, any type can be employed. But, in this preferred embodiment, the bias spring which is formed of a linear spring material in the shape of a coil is used.

The control valve member 2 is formed into a cylindrical valve, the hot water valve 2a is formed at one end edge (upper end edge in FIGS. 1A and 2) of a cylinder wall of the cylindrical valve, and the cold water valve 2b is formed at the other end edge. Further, a cylinder portion 20 is formed at an axis site of the control valve member 2.

The actuator 5 is constituted by SMA springs. In particular, one that is constituted by a coil-like SMA spring 5a having a wire material wound to have a large diameter and a coil-like SMA spring 5b having a wire material wound to have a small diameter is used. The actuator 5 is used in a situation where the two coil-like SMA springs 5a and 5b are combined into double coils and arranged coaxially in parallel. In particular, in the state of the combined double coils, the SMA springs 5a and 5b are sandwiched by the holder 700 and the spring bracket 71 formed at the valve seat member 1c.

The holder 700 is provided with a spring bracket 70 which supports the actuator 5. A cylindrical cover 7 which is extended downwards is formed at one face (face which supports the actuator 5) of the spring bracket 70 (see FIG. 2). This cylindrical cover 7 is formed of a resin material integrally and contiguously with the spring bracket 70 by molding it together with the spring bracket 70, for example.

The reinforcement member 120 is formed in the shape of a disk, in the center of which a hole for inserting the support member 6 is formed. One face of the reinforcement member 120 is in abutment with a face opposite to a support face of the actuator 5 of the holder 700, and the other face is in abutment with an end of the cylinder portion 20 of the control valve member 2. Further, the reinforcement member 120 is shaped to cover substantially the whole face opposite to the support face of the actuator 5 of the holder 700.

Thus, by arranging that the reinforcement member 120 is disposed between the end of the control valve member 2 and the holder 700 which supports the actuator 5, the strength of the holder 700 is improved and a possibility of the holder 700 being damaged can be reduced.

In addition, the reason why the strength of the holder 700 is improved in this way is that when the holder 700 is damaged there is a possibility that the user may discharge the hot mixed water with an unexpected high temperature.

In particular, if the holder 700 which supports the actuator 5 arranged in the mixing chamber 13 is damaged, the control valve member 2 may not be subjected to the load from the actuator 5. Thus, the control valve member 2 is subjected to only the load from the biasing member 4, and therefore biased in one direction towards the cold water valve seat 10b side. As a result, only the hot water inlet a side is opened, and the mixed water may be discharged at the high temperature that the user does not expect. Therefore, in this preferred embodiment, the possibility that the mixed water with the high temperature, which the user does not expect, may be discharged is reduced by increasing the strength of the holder 700.

Although a particular structure of the reinforcement member 120 is not particularly limited, it is possible to use the washer made of stainless steel (SUS) which covers substantially the whole face opposite to the support face of the actuator 5 of the holder 700, for example.

Thus, when the reinforcement member 120 is formed into the shape of a washer made of SUS, the strength of the holder 700 can be improved with components having a smaller volume, compared with the holder 700 made of a resin.

Therefore, according to the structure of this preferred embodiment, it is not necessary to enlarge the space of the mixing chamber 13 in order to improve the strength of the holder 700. In other words, in this preferred embodiment, it is possible not only to strengthen the holder 700 but also to contribute to miniaturization of the hot and cold water mixing valve.

In addition, it is also possible to improve the strength of the holder 700 by increasing a thickness of the holder 700. However, if this is the case, since the volume of the holder 700 increases, the space of the upstream mixing-chamber 13a for mixing the hot and cold water decreases. Therefore, when the thickness of the holder 700 is increased, there arises another problem that the accuracy in temperature control may be worsened, unless the capacity of the upstream mixing-chamber 13a is increased.

Further, for the reinforcement member 120, it is possible to use one that is made of a metal. Thus, by allowing the reinforcement member 120 to be made of a metal, it is possible to prevent thermal fatigue caused by the hot water which hits it for a long time or repeatedly at a high temperature and a high pressure.

Further, the reinforcement member 120 may be molded from a material different from that for the holder 700. For example, the reinforcement member 120 may be molded from materials having higher strength and hardness and ones with lower heat conductivity and lower surface friction coefficient than those of the holder 700. Furthermore, as for the reinforcement member 120, an additive etc. may be added to the resin so as to change the above-mentioned physical properties.

In addition, as described above, since the reinforcement member 120 is smaller in volume than the holder 700, it is possible to reduce the costs even if it is molded from a strong material.

Next, an arrangement of the support member 6, the biasing member 4, the spring bracket 72, the spring bracket 73, the control valve member 2, the reinforcement member 120, the holder 700, and the actuator 5 in the casing 1 will be described.

The biasing member 4 supported between the two spring brackets 73 and 72 is slidably fitted to the support member 6. Then, the engaging member 62, such as an E-shaped retaining ring, is secured to an upper end (upper end in FIGS. 1A and 2) of the support member 6, to limit upward movement of the biasing member 4 supported by the spring bracket 73. Further, the control valve member 2 is fitted to the support member 6 so that one side of the cylinder portion 20 may abut the spring bracket 72. Furthermore, the reinforcement member 120 is fitted to the support member 6 so as to abut the other side of the cylinder portion 20 of the control valve member 2. The holder 700 is fitted to the support member 6 so as to abut the reinforcement member 120.

The spring bracket 72, the control valve member 2, the reinforcement member 120, and the holder 700 are fixed to the support member 6 by means of an engaging member 63, such as an E-shaped retaining ring, in a situation where one side of the cylinder portion 20 of the control valve member 2 is in abutment with the spring bracket 72, the other side of the cylinder portion 20 is in abutment with one side of the reinforcement member 120, and the other side of the reinforcement member 120 is in abutment with the holder 700.

Further, in a situation where the biasing member 4, the spring bracket 72, the spring bracket 73, the control valve member 2, the reinforcement member 120, and the holder 700 are attached to the support member 6, the support member 6 is fitted into the cylinder of the cylindrical adjusting screw shaft 9 so that the spring bracket 73 may come into abutment with the support portion 90 of the adjusting screw shaft 9 incorporated into the cover member 1a and the main body 1b.

Furthermore, a lower end side (lower side in FIGS. 1A and 2) of the support member 6 is slidably fitted into the guide hole 18 so that one end of the actuator 5 may be supported by the holder 700 and the other end of the actuator 5 may be supported by the spring bracket 71 formed at the valve seat member 1c.

In addition, the actuator 5 constituted by the two SMA springs 5a and 5b is supported by the holder 700 and the spring bracket 71 as follows.

In particular, the coil-like SMA spring 5a with a large diameter is mounted on a perimeter side of the cover 7 of the holder 700, and the coil-like SMA spring 5b with a small diameter is inserted in an inner circumference side of a cover 7. The SMA spring 5a and the SMA spring 5b are sandwiched between the spring bracket 70 and the spring bracket 71 of the valve seat member 1c.

Next, operation of the hot and cold water mixing valve of this preferred embodiment will be described with reference to FIGS. 3A, 3B, and 3C.

Figure 3A:
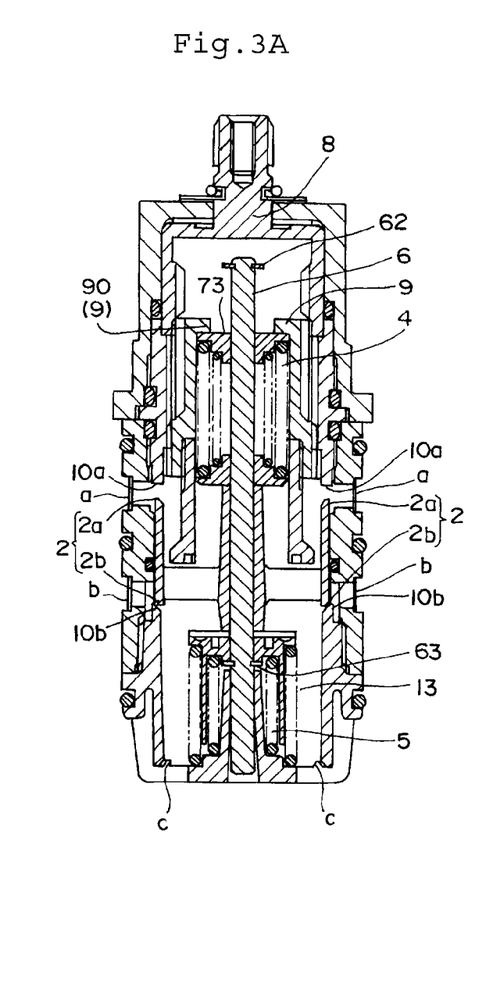
FIG. 3A A view for explaining operation of the hot and cold water mixing valve in accordance with a preferred embodiment of the present invention.

FIG. 3A is a sectional view for explaining the operation of the hot and cold water mixing valve in accordance with this preferred embodiment, and illustrates a longitudinal sectional front view in a situation where the control valve member of the hot and cold water mixing valve closes a cold water valve seat.

Figure 3B:
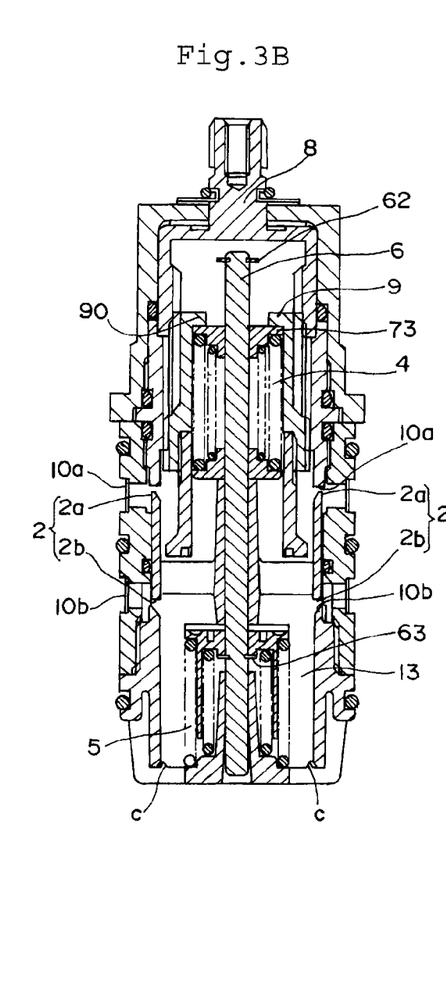
FIG. 3B A view for explaining operation of the hot and cold water mixing valve in accordance with the preferred embodiment of the present invention.

Further, FIG. 3B is a sectional view for explaining the operation of the hot and cold water mixing valve in accordance with this preferred embodiment, and illustrates a longitudinal sectional front view in a situation where the control valve member of the hot and cold water mixing valve opens both a hot water valve seat and the cold water valve seat.

Figure 3C:
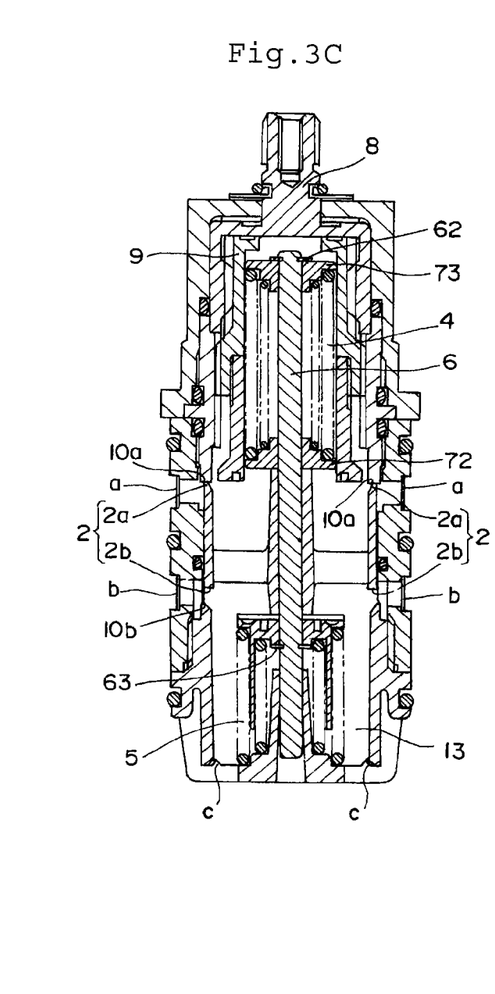
FIG. 3C A view for explaining operation of the hot and cold water mixing valve in accordance with the preferred embodiment of the present invention.

Furthermore, FIG. 3C is a sectional view for explaining the operation of the hot and cold water mixing valve in accordance with this preferred embodiment, and illustrates a longitudinal sectional front view in a situation where the control valve member of the hot and cold water mixing valve closes the hot water valve seat.

In addition, hereinafter, the description will be carried out by way of example only with reference to an example in which as the adjusting screw 8 is rotated clockwise, the adjusting screw shaft 9 is accordingly guided by the support member 6 to ascend in an axial direction, and as the adjusting screw 8 is rotated counterclockwise, the adjusting screw shaft 9 is accordingly guided by the support member 6 to descend in the axial direction.

In FIG. 3A, it is arranged that the control valve member 2 shuts the cold water inlet b and opens only the hot water inlet a to thereby discharge the hot water with a high temperature.

Thus, in such an arrangement, the user rotates the adjusting screw 8 (knob 82 of the adjusting screw 8) counterclockwise (in this case, rotates it until the cold water inlet b is shut off). As the adjusting screw 8 rotates counterclockwise, the adjusting screw shaft 9 is accordingly guided by the support member 6 to descend in the axial direction (it moves downward as shown in FIGS. 3A, 3B, and 3C). As the adjusting screw shaft 9 descends, the load applied to the biasing member 4 in the axial direction through the support portion 90 increases. Thus, the actuator 5 is compressed by the increased load, the control valve member 2 is biased towards the cold water valve seat 10b side, and the cold water valve 2b comes into abutment with the cold water valve seat 10b. In this arrangement, since only the hot water through the hot water inlet a flows into the hot and cold water mixing valve, the hot water with a high temperature is discharged through the mixed water outlet c formed in the mixing chamber 13.

Further, it is assumed that the user operates the temperature adjusting dial D to rotate the adjusting screw 8 clockwise in order to discharge the mixed water in the state of FIG. 3A. As the adjusting screw 8 rotates clockwise, the adjusting screw shaft 9 is accordingly guided by the support member 6 to ascend in the axial direction (it moves upwards as shown in FIGS. 3A, 3B, and 3C), and positioned as shown in FIG. 3B. In this case, the load applied to the biasing member 4 in the axial direction through the support portion 90 decreases due to the rise of the adjusting screw shaft 9. Thus, the actuator 5 expands by the decreased load, and the control valve member 2 is biased towards the hot water valve seat 10a side. As a result, the spacing between the cold water valve 2b and the cold water valve seat 10b is opened, the spacing between the hot water valve 2a and the hot water valve seat 10a narrows (it narrows compared with the state of FIG. 3A). In this arrangement, the hot water through the hot water inlet a and the cold water through the cold water inlet b flow into the hot and cold water mixing valve. Therefore, in the mixing chamber 13, the hot water and cold water flowed in are mixed to be the mixed water, and the mixed water is discharged through the mixed water outlet c.

Further, as shown in FIG. 3B, in the arrangement where the hot and cold water mixing valve discharges the mixed water, it is assumed that the flow rate of the incoming cold water decreases due to a hydraulic pressure drop etc., or the flow rate of the incoming hot water increases due to an increase in pressure of the hot water etc., so that the temperature of the mixed water in the mixing chamber 13 rises. In this case, the hot and cold water mixing valve operates as follows.

In particular, when the flow rate of the incoming water is decreased due to the hydraulic pressure drop etc., or the flow rate of the incoming hot water increases due to the increase in pressure of the hot water etc., so that the temperature of the mixed water in the mixing chamber 13 rises, then the actuator 5 which detects it acts to increase the generating load. When the actuator 5 acts to increase the generating load, the biasing member 4 is compressed and the control valve member 2 is biased towards the hot water valve seat 10a side, whereby the spacing between the hot water valve 2a and the hot water valve seat 10a narrows to decrease a rate of hot water inflow and the spacing between hot water valve 2b and the cold water valve seat 10b is widened to increase a rate of cold water inflow. As a result, the hot and cold water mixing valve can reduce the increased temperature of the mixed water.

On the other hand, as shown in FIG. 3B, in the arrangement where the hot and cold water mixing valve discharges the mixed water, it is assumed that the flow rate of the incoming cold water increases due to the increase in hydraulic pressure of the cold water etc., or the flow rate of the incoming hot water decreases due to the pressure drop of the hot water etc., so that the temperature of the mixed water in the mixing chamber 13 drops. In this case, the hot and cold water mixing valve operates as follows.

In particular, the flow rate of the incoming cold water increases due to the increase in hydraulic pressure etc., or the flow rate of the incoming hot water decreases due to the pressure drop of the hot water etc., so that the temperature of the mixed water in the mixing chamber 13 drops, then the actuator 5 which detects it acts to decrease the generating load. When the actuator 5 acts to decrease the generating load, the biasing member 4 expands by the decreased load and the control valve member 2 is biased towards the cold water valve seat 10b side, whereby the spacing between the hot water valve 2a and the hot water valve seat 10a is widened to increase the rate of hot water inflow and the spacing between the cold water valve 2b and the cold water valve seat 10b narrows to decrease the rate of cold water inflow. As a result, the hot and cold water mixing valve can raise the temperature drop of the mixed water.

Further, in the state of FIG. 3B, in order to discharge the cold water only, the user operates the temperature adjusting dial D and rotates the adjusting screw 8 clockwise (in this case, it is rotated until the hot water inlet a is shut off). As described above, as the adjusting screw 8 rotates clockwise, the adjusting screw shaft 9 is accordingly guided by the support member 6 to ascend in the axial direction (it moves upward as shown in FIG. 3), and positioned as shown in FIG. 3C. In this case, the load applied to the biasing member 4 in the axial direction through the support portion 90 decreases due to the rise of the adjusting screw shaft 9. Thus, the actuator 5 expands by the decreased load, and the control valve member 2 is biased towards the hot water valve seat 10a side. As a result, the hot water valve 2a comes into abutment with the hot water valve seat 10a, and the spacing between the cold water valve 2b and the cold water valve seat 10b is widened (spreads compared with the state of FIG. 3B). In this arrangement, since the hot water inlet a is shut off, only the cold water through the cold water inlet b flows into the hot and cold water mixing valve, and the cold water is discharged through the mixed water outlet c.

As described above, according to this preferred embodiment, the arrangement of the spacer 100 and the recess 83 provided at the upper surface 11 of the adjusting screw 8 allows the strength of the casing 1 to be improved. Further, as described above, according to this preferred embodiment, since it is arranged that the reinforcement member 120 is interposed between the end of the control valve member 2 and the holder 700 which supports the actuator 5, the strength of the holder 700 can be improved and a possibility that the holder 700 may be damaged can be reduced.

Thus, according to the preferred embodiments of the present invention, it is possible to improve the durability of the hot and cold water mixing valve.

In addition, the present invention is not limited to the preferred embodiments above, and various modifications are possible without departing from the scope of the invention.

The invention claimed is:

1. A hot and cold water mixing valve, comprising:
a temperature adjusting dial which is subjected to temperature control operation, and
a main body member having a control valve mechanism for adjusting temperatures of hot water and cold water by operating said temperature adjusting dial and a casing in which a hot water inlet and a cold water inlet are formed and said control valve mechanism is accommodated,
wherein a hole opens in an axial center part of one end of said casing,
wherein said main body member comprises:
    a biasing member made of a material having a fixed spring constant,
    an actuator which expands or shrinks according to a temperature change,
    a control valve member in which one end is subjected to a load from said biasing member and the other end is subjected to a load from said actuator, and an opening/closing ratio between said hot water inlet and said cold water inlet is changed by balancing between the loads applied by said biasing member and said actuator, and a temperature adjuster whose one side is fixed to said temperature adjusting dial and which moves said biasing member according to rotation of said temperature adjusting dial to apply a load to said control valve member and to set up a position of said control valve member, and is formed in the shape of a cylinder,
wherein an upper surface is formed at one cylindrical end of said temperature adjuster, a knob which is substantially cylindrical and fixed to said temperature adjusting dial is formed in the center of said upper surface, and a ring-shaped recess concentric with said knob is formed in said upper surface of said one cylindrical end of said temperature adjuster, at a peripheral part of said knob,
wherein said temperature adjuster is arranged inside one end of said casing and coaxially with said casing and said knob is rotatably inserted into the hole which opens at one end of said casing, and
wherein a spacer which covers the recess formed in said upper surface is interposed and held between the upper surface of said temperature adjuster and one end of said casing.

2. A hot and cold water mixing valve, comprising:
a casing in which a hot water inlet and a cold water inlet are formed, and
a main body member provided in said casing,
wherein said main body member comprises:
    a biasing member made of a material having a fixed spring constant,
    an actuator which expands or shrinks according to a temperature change,
    a control valve member in which one end is subjected to a load from said biasing member and the other end is subjected to a load from said actuator, and an opening/closing ratio between said hot water inlet and said cold water inlet is changed by balancing between the loads applied by said biasing member and said actuator, and
    a holder in which a support face for supporting one end of said actuator is formed,
wherein a mixing chamber for mixing hot water from said hot water inlet and cold water from said cold water inlet is provided inside said casing,
wherein said actuator is supported between a support portion formed in said mixing chamber and said support face of said holder,
wherein a reinforcement member is interposed and held between a face opposite to said support face formed in said holder and said other end of said control valve member, and
wherein said holder is separate from and abuts said reinforcement member, and said reinforcement member is separate from and abuts said control valve member.

3. The hot and cold water mixing valve as claimed in claim 2, wherein said reinforcement member is a metal washer which covers substantially the whole face opposite to said support face of said holder, and said holder is made of a resin.

4. The hot and cold water mixing valve as claimed in claim 2, wherein said reinforcement member is a washer which covers substantially the whole face opposite to said support face of said holder and said reinforcement member and said holder are respectively molded from materials with different properties.

* * * * *